(12) United States Patent
Roche et al.

(10) Patent No.: US 8,865,838 B2
(45) Date of Patent: Oct. 21, 2014

(54) PROCESS FOR FORMING THERMOPLASTIC VULCANIZATES

(75) Inventors: Stephen F. Roche, Cwmbran (GB); Randal H. Kerstetter, Wadsworth, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 196 days.

(21) Appl. No.: 12/953,552

(22) Filed: Nov. 24, 2010

(65) Prior Publication Data

US 2011/0160402 A1 Jun. 30, 2011

Related U.S. Application Data

(60) Provisional application No. 61/291,244, filed on Dec. 30, 2009.

(51) Int. Cl.
| | | |
|---|---|---|
| *C08F 8/00* | (2006.01) | |
| *C08J 3/00* | (2006.01) | |
| *C08L 9/00* | (2006.01) | |
| *C08L 23/10* | (2006.01) | |

(52) U.S. Cl.
USPC ........... 525/192; 525/197; 525/198; 525/232; 525/240

(58) Field of Classification Search
USPC .......................... 525/192, 197, 198, 232, 240
See application file for complete search history.

(56) References Cited

U.S. PATENT DOCUMENTS

| | | | |
|---|---|---|---|
| 2,972,600 A | 2/1961 | Braidwood | |
| 3,287,440 A * | 11/1966 | Giller ............................ | 525/139 |
| 3,645,911 A | 2/1972 | van Besauw et al. | |
| 3,692,736 A | 9/1972 | Besnard et al. | |
| 4,311,628 A | 1/1982 | Abdou-Sabet et al. | |
| 4,518,478 A | 5/1985 | Weller | |
| 4,518,738 A | 5/1985 | Sorensen et al. | |
| 4,540,753 A | 9/1985 | Cozewith et al. | |
| 4,594,390 A | 6/1986 | Abdou-Sabet et al. | |
| 5,100,947 A | 3/1992 | Puydak et al. | |
| 5,151,081 A | 9/1992 | Williams | |
| 5,290,866 A | 3/1994 | Dobreski et al. | |
| 5,349,005 A | 9/1994 | Tanaka | |
| 5,397,832 A | 3/1995 | Ellul | |
| 5,656,693 A | 8/1997 | Ellul et al. | |
| 5,936,028 A | 8/1999 | Medsker et al. | |
| 5,952,425 A | 9/1999 | Medsker et al. | |
| 6,042,260 A | 3/2000 | Heidemeyer et al. | |
| 6,143,828 A | 11/2000 | Chee et al. | |
| 6,147,160 A | 11/2000 | Wang et al. | |
| 6,437,030 B1 | 8/2002 | Coran et al. | |
| 6,451,915 B1 | 9/2002 | Ellul et al. | |
| 6,774,162 B1 | 8/2004 | Vortkort et al. | |
| 6,867,260 B2 | 3/2005 | Datta et al. | |
| 7,153,908 B2 * | 12/2006 | Park .............................. | 525/192 |
| 7,226,975 B2 * | 6/2007 | Voorheis et al. .............. | 525/193 |
| 7,439,304 B2 | 10/2008 | Ellul et al. | |
| 7,521,501 B2 * | 4/2009 | James et al. ................... | 524/502 |
| 2004/0236042 A1 | 11/2004 | Datta et al. | |
| 2005/0089595 A1 | 4/2005 | Blach | |
| 2005/0140049 A1 | 6/2005 | James et al. | |
| 2005/0272871 A1 | 12/2005 | Ellul et al. | |
| 2007/0129483 A1 | 6/2007 | James et al. | |
| 2007/0254971 A1 | 11/2007 | De Vogel et al. | |
| 2007/0265387 A1 | 11/2007 | James et al. | |

FOREIGN PATENT DOCUMENTS

| | | |
|---|---|---|
| EP | 1 655 332 | 5/2006 |
| GB | 2455981 A | 7/2009 |
| JP | 62-13457 | 1/1987 |
| JP | A-2004-137352 | 5/2004 |
| JP | A-2009-120731 | 6/2009 |
| WO | WO 2004/009327 | 1/2004 |
| WO | WO 2006/022666 | 3/2006 |
| WO | WO 2008/039599 | 4/2008 |

OTHER PUBLICATIONS

M. C. Chen et al., "Acid Catalysis in the Phenolic Resin Vulcanization of Unsaturated Rubbers," Macromolecules, 1971, 4 (5), pp. 652-653.
JP 62-13457 (Abstract), Jan. 22, 1987.
Ver Strate et al., *"Near Monodisperse Ethylene-Propylene Copolymers by Direct Ziegler-Natta Polymerization. Preparation, Characterization, Properties,"* Macromolecules 1988, vol. 21, pp. 3360-3371.
Ellul et al., *"Crosslink Densities and Phase Morphologies in Dynamically Vulcanized TPEs,"* Rubber Chemistry and Technology, vol. 68, 1995, pp. 573-584.
Ellul et al., "Chemical Surface Treatments of Natural Rubber and EPDM Thermoplastic Elastomers: Effects on Friction and Adhesion," Rubber Chemistry and Technology, vol. 67, No. 4, 1994, pp. 582-601.

* cited by examiner

*Primary Examiner* — Nathan M Nutter

(57) ABSTRACT

Provided are methods for producing a thermoplastic vulcanizate. One method includes charging vulcanizable rubber to a reactor; charging a masterbatch of thermoplastic resin and a catalyst for a phenolic resin curative to the reactor; charging a phenolic resin curative to the reactor; and dynamically vulcanizing the rubber with the phenolic resin curative in the presence of the catalyst. Also provided are thermoplastic vulcanizates made by the methods of the invention.

15 Claims, 1 Drawing Sheet

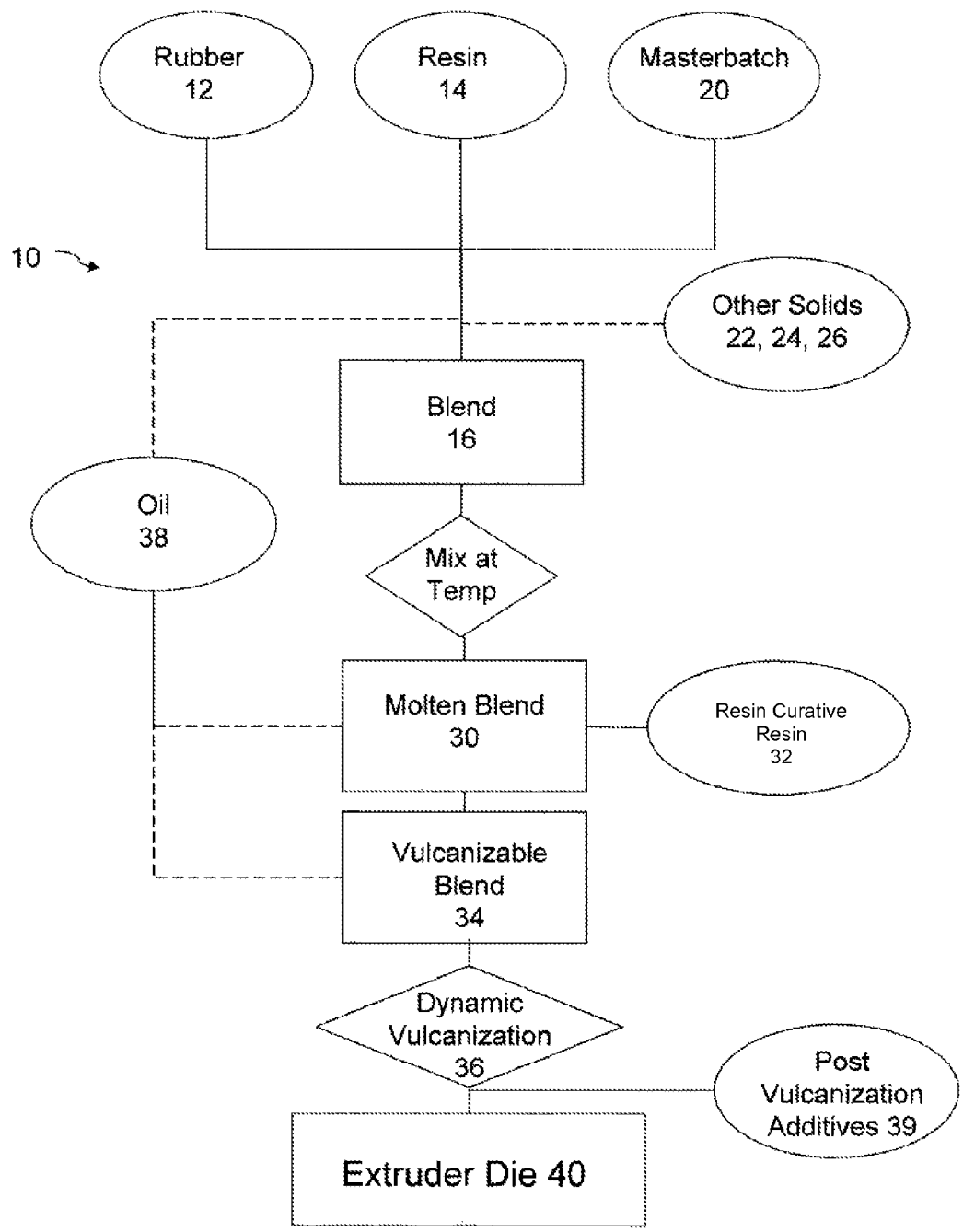

PROCESS FOR FORMING THERMOPLASTIC VULCANIZATES

CROSS REFERENCE TO RELATED APPLICATIONS

This application claims priority to U.S. Provisional Patent Application No. 61/291,244, filed Dec. 30, 2009, the disclosure of which is incorporated herein by reference in its entirety.

FIELD OF THE INVENTION

Embodiments of the present invention are directed toward methods for making thermoplastic vulcanizates, and thermoplastic vulcanizates prepared by such methods.

BACKGROUND OF THE INVENTION

Thermoplastic vulcanizates include blends of dynamically cured rubber and thermoplastic polymers. The rubber may be dispersed within the thermoplastic resin phase as finely-divided rubber particles. These compositions have advantageously demonstrated many of the properties of thermoset elastomers, yet they are processable as thermoplastics. Because thermoplastic vulcanizates are advantageously processable as thermoplastics, elastomeric articles are often extruded from thermoplastic vulcanizates using thermoplastic extruding techniques.

Thermoplastic vulcanizates may advantageously be prepared by dynamically vulcanizing a rubber with a phenolic resin while the rubber is being mixed with a thermoplastic resin. U.S. Pat. No. 4,311,628 teaches thermoplastic vulcanizates including fully-cured rubber can be produced by using phenolic resin cure systems that include a phenolic curing resin and a cure activator such as stannous chloride. According to the present invention, from 5 to 20 parts by weight phenolic resin and 0.1 to 10 parts by weight cure activator, per 100 parts by weight rubber, may be used. Likewise, U.S. Pat. No. 5,952,425 teaches the use of halogen donors in an amount from about 0.01 to 10 parts by weight per 100 parts by weight rubber. The stannous chloride may be employed in an excess of one part by weight per 100 parts by weight rubber in order to achieve technologically useful products that include fully-cured rubber.

Disadvantageously, it is believed that the stannous chloride leads to several drawbacks. For example, the stannous chloride contributes to the hygroscopicity of thermoplastic vulcanizates. Attempts have been made to reduce the propensity of these thermoplastic vulcanizates to attract and absorb atmospheric moisture. Unfortunately, these attempts have not met with a great degree of success. Where a cure activator such as stannous chloride is completely removed from the system, the ability to fully cure the rubber is precluded as suggested in U.S. Pat. No. 6,143,828. As a result, thermoplastic vulcanizates that exhibit the advantageous properties associated with fully-cured rubber cannot be attained. U.S. Pat. No. 5,952,425 also suggests that cure kinetics are not technologically useful in the absence of stannous chloride. Other attempts to alleviate the problem have included the use of alternate activator systems. For example, U.S. Pat. No. 6,437,030 teaches the use of reduced-halide systems based on metal carboxylates. Unfortunately, these systems tend to have slower cure kinetics and often result in lower cure states. Also, these systems often require preventative measures to compensate for drastic reductions in heat stability that have been observed. As for shelf life, current attempts to minimize the problem have focused on the packaging of the thermoplastic vulcanizates, where special foil liners are often employed. This is not only costly, but also it is not a solution to the problem.

In addition to problems associated with hygroscopicity, thermoplastic vulcanizates prepared with phenolic resin cure systems with a stannous chloride cure activator have exhibited a propensity to plate out, which refers to residue buildup within extrusion dies that can eventually affect engineering tolerances. Therefore, conventional extrusion practices often require routine cleaning of the dies. The prior art has not offered any explanation as to why this plate out occurs and, moreover, has not offered any solution to the problem.

U.S. Pat. No. 7,439,304 teaches thermoplastic vulcanizates having at least 0.2 parts by weight and less than 0.9 parts by weight stannous chloride stannous chloride, per 100 parts by weight rubber. Below 0.2 parts by weight, the thermoplastic vulcanizates do not have adequate heat resistance and above these amounts the thermoplastic vulcanizates show appreciable plate-out and have a deleterious impact on the hygroscopicity of the thermoplastic vulcanizates. Within this range, an advantageous cure was discovered while taking advantage of the improved hygroscopicity resulting from the reduced use of stannous chloride. Also, the extruded and molded parts prepared from these thermoplastic vulcanizates showed less porosity after extended storage even without special packaging.

Still other problems include those associated with manufacturing the thermoplastic vulcanizates with the stannous chloride. The stannous chloride is a solid material, often in the form of a powder, that is difficult to handle and not easily metered into the reactors where dynamic vulcanization takes place. Also, the stannous chloride can be difficult to disperse throughout the blend of the rubber and thermoplastic resin. It is furthermore believed that stannous chloride participates in certain side reactions that lead to poor surface appearance of extruded thermoplastic vulcanizates.

Because phenolic resin cure systems provide significant advantages over other cure systems that may be employed in the production of thermoplastic vulcanizates, there is a continued need to alleviate some of the problems associated with the use of these cure systems in the production of thermoplastic vulcanizates.

BRIEF DESCRIPTION OF THE DRAWINGS

FIG. 1 is a flow chart showing a process according to embodiments of the invention.

SUMMARY OF THE INVENTION

One or more embodiments of the present invention provides a method for producing thermoplastic vulcanizate, the method comprising the steps of charging vulcanizable rubber to a reactor; charging a masterbatch of thermoplastic resin and a catalyst for a phenolic resin curative to the reactor; charging a phenolic resin curative to the reactor; dynamically vulcanizing the rubber with the phenolic resin curative in the presence of the catalyst.

One or more embodiments of the present invention further provides a method for preparing a thermoplastic vulcanizate, the method comprising the steps of: mixing a vulcanizable rubber and a first thermoplastic resin above the melt temperature of the thermoplastic resin to form a molten mass; adding a masterbatch including a second thermoplastic resin and catalyst to the molten mass; melting the thermoplastic resin of the masterbatch to thereby disperse the catalyst within the molten mass; adding a phenolic curative to the molten mass; dynamically vulcanizing the rubber with the phenolic resin in the presence of the catalyst.

One or more embodiments of the present invention further provides a method for preparing a thermoplastic vulcanizate, the method comprising the steps of charging a poly(ethylene-propylene-diene)copolymer to a twin-screw extruder through the feed throat of the extruder; charging polypropylene to the twin-screw extruder through the feed throat of the extruder; mixing, within an initial mix zone, the poly(ethylene-propylene-diene)copolymer and the polypropylene at a temperature above the melt temperature of the polypropylene to form a molten mass; charging pellets that include a blend of polypropylene and anhydrous stannous chloride to the twin-screw extruder through an inlet in a barrel downstream of the initial mix zone; heating the pellets above the melt temperature of the polypropylene and mixing the molten polypropylene with the molten mass; charging a phenolic resin curative to the twin-extruder through an inlet in a barrel downstream of the barrel where the pellets are charged; mixing the phenolic resin with the molten mass while transferring the molten mass through a cure zone where dynamic vulcanization of the rubber takes place to thereby form a thermoplastic vulcanizate; removing the thermoplastic vulcanizate from the twin-screw extruder; cooling the thermoplastic vulcanizate; and pelletizing the thermoplastic vulcanizate.

DETAILED DESCRIPTION OF ILLUSTRATIVE EMBODIMENTS

I. Introduction

Embodiments of the invention are based, at least in part, on the discovery that technologically useful thermoplastic vulcanizates can be prepared by a dynamic vulcanization process that includes phenolic resin curing in the presence of a catalyst, where the catalyst is delivered to the process as a preformed blend (i.e., masterbatch) with a thermoplastic resin. While dynamic vulcanization techniques that employ phenolic resin and catalyst are known, the delivery of the catalyst to the vulcanizable composition has heretofore not been provided to the composition in the form of a masterbatch with a thermoplastic resin. By doing so, several advantages have been achieved. For example, by performing a blend of the catalyst and thermoplastic resin, the catalyst, which is often susceptible to moisture pickup, can be encapsulated within the thermoplastic resin and thereby be less susceptible to moisture pickup. Unwanted pre-reactions between the stannous chloride and the rubber can be reduced or eliminated. The masterbatch also provides a more efficient method for metering more precise amounts of catalyst to the composition. And, it has unexpectedly been discovered that the catalyst can be more evenly dispersed throughout the vulcanizable composition and thereby effect a more efficient cure of the rubber. Likewise, the masterbatch may advantageously shield the stannous chloride from participating in undesirable side reactions until the time (i.e., during cure) when stannous chloride is needed. As a result of improved metering and possible protection from side reactions, the overall efficiency of the stannous chloride is believed to be improved thereby obviating the need to feed excess stannous chloride to the process, which is especially advantageous as related to large commercial processes where excess stannous chloride is often used.

II. Dynamic Vulcanization Process

In one or more embodiments, the process of the present invention includes dynamic vulcanization of a rubber within a blend with a thermoplastic resin. As those skilled in the art appreciate, dynamic vulcanization includes a process whereby a rubber that is undergoing mixing with a thermoplastic resin is cured. In one or more embodiments, the rubber may be crosslinked or vulcanized under conditions of high shear at a temperature above the melting point of the thermoplastic. As a result of the process, the thermoplastic phase becomes the continuous phase of the mixture. In one or more embodiments, the rubber phase becomes a discontinuous phase of the mixture. In one or more embodiments, the rubber undergoes a phase inversion during dynamic vulcanization, where the blend, which initially includes a major volume fraction of rubber, is converted to a blend where the plastic phase is the continuous phase. In one embodiment, the rubber can be simultaneously crosslinked and dispersed as fine particles within the thermoplastic matrix, although other morphologies may also exist.

In general, the dynamic vulcanization takes place within a reactor, as will be described in greater detail below. In one or more embodiments, the rubber and the thermoplastic resin are introduced to the reactor as solids. The rubber and plastic are then mixed at a temperature above the melt temperature of the thermoplastic resin. Following this initial blending, the phenolic resin curative is introduced to the blend and curing of the rubber proceeds.

According to the present invention, stannous chloride is introduced to the reactor as a masterbatch with a thermoplastic resin. In one or more embodiments, the masterbatch of stannous chloride and thermoplastic resin is in the form of solid particles. In one or more embodiments, these solid particles are introduced to the reactor together with the rubber and thermoplastic resin. The masterbatch may then undergo mixing with the rubber and thermoplastic resin at elevated temperatures, which may include temperatures at or above the melt temperature of the thermoplastic resin.

The process of one or more embodiments of the present invention can be described with reference to FIG. 1. The process 10 includes introducing a rubber 12 with a first thermoplastic resin 14 to form a blend 16, which may be referred to as a solids blend 16, although not all components of the blend need to be in the solid state. Additionally, a masterbatch 20 of stannous chloride and a second thermoplastic resin are introduced to the rubber 12 and thermoplastic resin 14 to form blend 16. Also, other solid ingredients can be introduced with blend 16 such as fillers 22, zinc oxide 24, and other miscellaneous solids 26 such as pigments and antioxidants. These miscellaneous solids can be pre-blended with other solids, such as the rubber, prior to blending with the other ingredients, or they may be separately combined with the other solid ingredients to form solids blend 16.

Blend 16 is continually mixed at a temperature above the melt temperature of first thermoplastic resin 14 to form molten blend 30. A phenolic resin curative 32, which may be in the form of a liquid, is introduced to molten blend 30 to form vulcanizable blend 34. Heating and mixing continues in order to effect dynamic vulcanization 36.

An oil 38 can be introduced at any stage, or in multiple stages, of the process. For example, oil 38 can be added to solids blend 16, to molten blend 30, together with curative 32, or after dynamic vulcanization 36.

Following dynamic vulcanization 36, mixing may continue and additional additives or ingredients can be incorporated into the molten product, which may be referred to as a molten thermoplastic vulcanizate. For example, post vulcanization additives 39, such as acid scavengers, can be added to the molten mass following dynamic vulcanization 36. The product, can then be extruded through an extruder die 40, or otherwise fabricated, and ultimately cooled for handling. Further manufacturing and processing of the thermoplastic vulcanizate may proceed in a conventional manner. For example, the molten thermoplastic vulcanizate composition may be cooled and/or solidified and subsequently pelletized for future storage and/or shipment. Practice of the present invention is not necessarily limited by the manner in which the thermoplastic vulcanizate composition is subsequently solidified or fabricated.

The process of dynamic vulcanization according to one or more embodiments of this invention can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruder). Methods and equipment for continuously preparing thermoplastic vulcanizates are described in U.S. Pat. Nos. 4,311,628; 4,594,390; 5,656,693; 6,147,160; and 6,042,260, as well as WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed. In particular embodiments, oil is introduced to the mixture. In certain embodiments, the addition of sufficient oil allows for the achievement of particular advantageous properties of the thermoplastic vulcanizate.

III. Thermoplastic Vulcanizate Ingredients

Practice of the present invention is not necessarily limited by the selection of the particular ingredients used to prepare the thermoplastic vulcanizate composition.

a. Rubber Component

The rubbers that may be employed to form the rubber phase include those polymers that are capable of being cured or crosslinked. Reference to a rubber may include mixtures of more than one rubber. Non-limiting examples of rubbers include olefinic elastomeric copolymers, butyl rubber, and mixtures thereof. In one or more embodiments, olefinic elastomeric copolymers include ethylene-propylene-non-conjugated diene rubbers or propylene-based rubbery copolymers containing units derived from non-conjugated diene monomers.

b. Ethylene-Propylene Rubber

The term ethyl-propylene rubber refers to rubbery copolymers polymerized from ethylene, at least one α-olefin monomer, and at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinylbenzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. Copolymers prepared from ethylene, α-olefin, and diene monomers may be referred to as a terpolymer or even a tetrapolymer in the event that multiple α-olefins or dienes are used.

In one or more embodiments, the ethylene-propylene rubber includes from about 12 to about 85% by weight, or from about 20 to about 80% by weight, or from about 40 to about 70% by weight, or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units deriving from α-olefin monomer (e.g., $C_3$-$C_{10}$ olefins such as propylene). Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-ethylidene-2-norbornene. In one or more embodiments, where the diene includes 5-vinyl-2-norbornene, the ethylene-propylene rubber may include at least 1% by weight, in other embodiments at least 3% by weight, in other embodiments at least 4% by weight, in other embodiments at least 5% by weight, in other embodiments from about 1 to about 15% by weight, in other embodiments from about 5% to about 12% by weight, and in other embodiments from about 7% to about 11% by weight units deriving from 5-vinyl-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the $M_w$ of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_n$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules*, 1988, volume 21, p. 3360 by Ver Strate et al., which is also herein incorporated by reference, and references cited therein.

In one or more embodiments, ethylene-propylene rubber may also be characterized by having a Mooney viscosity (ML$_{(1+4)}$ at 125° C.) per ASTM D-1646, of from about 10 to about 500 or from about 50 to about 450. As used herein, Mooney viscosity is reported using the format: Rotor ([preheat time, min.]+[shearing time, min.]@measurement temperature, ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C.

Unless otherwise specified, Mooney viscosity is reported herein as ML(1+4@125° C.) in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125° C. or 150° C.) More preferably, the Mooney measurement for purposes herein is carried out using a non-standard small rotor. The non-standard rotor design is employed with a change in the Mooney scale that allows the same instrumentation on the Mooney instrument to be used with polymers having a Mooney viscosity over about 100 ML(1+4@125° C.). For purposes herein, this modified Mooney determination is referred to as MST—Mooney Small Thin.

ASTM D1646-99 prescribes the dimensions of the rotor to be used within the cavity of the Mooney instrument. This method allows for both a large and a small rotor, differing only in diameter. These different rotors are referred to in ASTM D1646-99 as ML (Mooney Large) and MS (Mooney Small). However, EPDM can be produced at such high molecular weight that the torque limit of the Mooney instrument can be exceeded using these standard prescribed rotors. In these instances, the test is run using the MST rotor that is both smaller in diameter and thinner. Typically, when the MST rotor is employed, the test is also run at different time constants and temperatures. The pre-heat time is changed from the standard 1 minute to 5 minutes, and the test is run at 200° C. instead of the standard 125° C. The value obtained under these modified conditions is referred to herein as MST (5+4@200° C.). Note: the run time of 4 minutes at the end of which the Mooney reading is taken remains the same as the standard conditions. One MST point is approximately equivalent to 5 mL points when MST is measured at (5+4@200° C.) and ML is measured at (1+4@125° C.). Accordingly, for the purposes of an approximate conversion between the two scales of measurement, the MST (5+4@200° C.) Mooney value is multiplied by 5 to obtain an approximate ML(1+4@125° C.) value equivalent. The MST rotor used herein was prepared and utilized according to the following specifications:

The rotor should have a diameter of 30.48+/−0.03 mm and a thickness of 2.8+/−0.03 mm (determined from the tops of serrations) and a shaft of 11 mm or less in diameter.

The rotor should have a serrated face and edge, with square grooves of about 0.8 mm width and depth of about 0.25-0.38 mm cut on 1.6 mm centers. The serrations will consist of two sets of grooves at right angles to each other thereby forming a square crosshatch.

The rotor shall be positioned in the center of the die cavity such that the centerline of the rotor disk coincides with the centerline of the die cavity to within a tolerance of +/−0.25 mm. A spacer or a shim may be used to raise the shaft to the midpoint, consistent with practices typical in the art for Mooney determination.

The wear point (cone shaped protuberance located at the center of the top face of the rotor) shall be machined off flat with the face of the rotor.

Mooney viscosities of the multimodal polymer composition may be determined on blends of polymers herein. The Mooney viscosity of a particular component of the blend is obtained herein using the relationship shown in (1):

$$\log ML = n_A \log ML_A + n_B \log ML_B \qquad (1)$$

wherein all logarithms are to the base 10; ML is the Mooney viscosity of a blend of two polymers A and B each having individual Mooney viscosities $ML_A$ and $ML_B$, respectively; $n_A$ represents the wt % fraction of polymer A in the blend; and $n_B$ represents the wt % fraction of the polymer B in the blend.

In the instant disclosure, Equation (1) has been used to determine the Mooney viscosity of blends comprising a high Mooney viscosity polymer (A) and a low Mooney viscosity polymer (B), which have measurable Mooney viscosities under (1+4@125° C.) conditions. Knowing ML, $ML_A$ and $n_A$, the value of $ML_B$ can be calculated.

However, for high Mooney viscosity polymers [i.e., Mooney viscosity greater than 100 ML(1+4@125° C.)], $ML_A$ is measured using the MST rotor as described above. The Mooney viscosity of the low molecular weight polymer in the blend is then determined using Equation 1 above, wherein $ML_A$ is determined using the following correlation (2):

$$ML_A(1+4@125° C.) = 5.13*MST_A(5+4@200° C.) \qquad (2)$$

In one or more embodiments, ethylene-propylene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g.

In one or more embodiments, the ethylene-propylene rubber may be characterized by a glass transition temperature ($T_g$), as determined by Differential Scanning calorimetry (DSC) according to ASTM E-1356, that is less than −20° C., in other embodiments less than −30° C., in other embodiments less than −50° C., and in other embodiments from about −20 to about −60° C.

Ethylene-propylene rubber may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts involving Group IV-VI metallocenes. Elastomeric copolymers are commercially available under the tradenames Vistalon™ (ExxonMobil Chemical Co.; Houston, Tex.), Keltan™ (DSM Copolymers), Nordel™ IP (Dow), NORDEL MG™ (Dow), Royalene™ (Lion Copolymer) and Buna™ (Lanxess).

c. Propylene-Based Rubbery Copolymer

In one or more embodiments, the propylene-based rubbery copolymer, which may also be referred to as propylene-α-olefin copolymers or propylene-based elastomers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, and α-olefin derived units. Stated another way, the propylene-based rubbery copolymers may include at least 60% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived and ethylene-derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C. In particular embodiments, the propylene-based rubbery copolymer exhibits no melting point.

In one or more embodiments, the propylene-based rubbery copolymer may be characterized by a heat of fusion (Hf), as determined according to DSC procedures according to ASTM E-793. This may be determined by placing 6 to 10 mg of sample into DSC equipment and heating the sample at about 10° C./min. In one or more embodiments, the propylene-based rubbery copolymer may be characterized by a heat of fusion of about 0 J/g, in other embodiments at least 0.5 J/g, in other embodiments at least 1.0 J/g, in other embodiments at least 1.5 J/g, in other embodiments at least 3.0 J/g, in other embodiments at least 4.0 J/g, in other embodiments at least 6.0 J/g, and in other embodiments at least 7.0 J/g. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of propylene units, as measured by $^{13}$C NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042, which is incorporated by reference herein.

In one or more embodiments, the propylene-based rubbery copolymer may have a percentage crystallinity of from 0.5% to 40%, in other embodiments 1% to 30%, and in other embodiments 5% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-based rubbery copolymer can also be expressed in terms of percentage of crystallinity. The thermal energy for the highest order of polypropylene is estimated at 209 J/g (i.e., 100% crystallinity is equal to 209 J/g). In other embodiments, the propylene-ethylene polymer may have a crystallinity of less than 40%, in other embodiments about 0.25% to about 25%, in other embodiments from about 0.5% to about 22%, and in other embodiments from about 0.5% to about 20%. In particular embodiments, the propylene-based rubbery copolymer has a crystallinity of 0%.

In one or more embodiments, the propylene-based rubbery copolymer can have a density of about 0.85 g/cm$^3$ to about 0.92 g/cm$^3$, in other embodiments about 0.87 g/cm$^3$ to 0.90 g/cm$^3$, and in other embodiments from about 0.88 g/cm$^3$ to about 0.89 g/cm$^3$ at room temperature as measured per the ASTM D-792 test method.

In one or more embodiments, the propylene-based rubbery copolymer can have a melt index (MI) (ASTM D-1238, 2.16 kg @ 190° C.), of less than about 10 dg/min, in other embodiments ≤6.5 dg/min, in other embodiments less than about 6 dg/min, in other embodiments less than about 5.5 dg/min, and in other embodiments less than about 5 dg/min.

In one or more embodiments, the propylene-based rubbery copolymer can have a melt flow rate (MFR) (ASTM D-1238, 2.16 kg @ 230° C.), equal to or greater than 0.2 dg/min, in other embodiments of at least 0.2 dg/min, in other embodiments at least 0.5 dg/min, and in other embodiments at least 1.0 dg/min. In these or other embodiments, the melt flow rate may be equal to or less than 350 dg/min, and in other embodiments less than 100 dg/min. In an embodiment, the propylene-based polymer has MFR of 0.5 dg/min to 350 dg/min, in other embodiments from 2 dg/min to 30 dg/min, in other embodiments from 5 dg/min to 30 dg/min, in other embodiments 10 dg/min to 30 dg/min, and in other embodiments 10 dg/min to about 25 dg/min.

In one or more embodiments, the propylene-based rubbery copolymers may have a Mooney viscosity [ML(1+4)@125° C.], as determined according to ASTM D-1646, of less than 100, in other embodiments less than 75, in other embodiments less than 60, and in other embodiments less than 30.

In one or more embodiments, the propylene-based rubbery copolymer can have a $M_w$, in other embodiments a $M_w$ of about 10,000 to about 1,000,000 g/mole, in other embodiments a $M_w$ of about 20,000 to about 500,000, g/mole and in other embodiments a $M_w$ of about 50,000 to about 400,000 g/mole.

In one or more embodiments, the propylene-based rubbery copolymer can have a $M_n$ of about 2,500 to about 2,500,000 g/mole, in other embodiments a $M_n$ of about 5,000 to about 500,000 g/mole, in other embodiments a $M_n$ of about 10,000 to about 250,000 g/mole, and in other embodiments a $M_n$ of about 25,000 to about 200,000 g/mole.

In one or more embodiments, the propylene-based rubbery copolymer can have a Z-average molecular weight ($M_z$) of about 10,000 to about 7,000,000 g/mole, in other embodiments a $M_z$ of about 50,000 to about 1,000,000 g/mole, in other embodiments a $M_z$ of about 80,000 to about 700,000 g/mole, and in other embodiments a $M_z$ of about 100,000 to about 500,000 g/mole.

In one or more embodiments, the molecular weight distribution index (MWD=($M_w/M_n$)) of the propylene-based rubbery copolymer may be about 1 to about 40, in other embodiments about 1 to about 5, in other embodiments about 1.8 to about 5, and in other embodiments about 1.8 to about 3.

d. Butyl Rubber

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinylstyrene. Exemplary alkyl substituted vinyl aromatic monomers include α-methylstyrene and paramethylstyrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, and copolymers of isobutylene and paramethyl styrene, terpolymers of isobutylene, isoprene, and vinylstyrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethylstyrene copolymer, the copolymer may include from about 0.5 to about 25, and from about 2 to about 20, percent by weight paramethylstyrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinylbenzene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinylbenzene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the $T_g$ of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethylstyrene are available under the tradename EXXPRO™ (ExxonMobil Chemical Co.), star branched butyl rubbers are available under the tradename STAR BRANCHED BUTYL™ (ExxonMobil Chemical Co.), and copolymers containing parabromomethylstyrenyl mer units are available under the tradename EXXPRO 3745 (ExxonMobil Chemical Co.). Halogenated and non-halogenated terpolymers of isobutylene, isoprene, and divinylstyrene are available under the tradename Polysar Butyl™ (Lanxess; Germany).

e. Plastic

The first thermoplastic resin, which may also be referred to as a first thermoplastic polymer, that can be employed to form the thermoplastic phase include those thermoplastic polymers that have been employed in the manufacture of thermoplastic vulcanizates as taught in the art. For purposes of this specification, the following description may also apply to the second thermoplastic resin. For example, these thermoplastic polymers, which may be referred to as thermoplastic resins or unfunctionalized thermoplastics, may include solid, generally high molecular weight plastic resins. Exemplary thermoplastic polymers include crystalline, semi-crystalline, and crystallizable polyolefins, olefin copolymers, and non-olefin resins.

The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to about 30% by weight of the polymer, for example, as in U.S. Pat. No. 6,867,260 B2, which is incorporated by reference herein. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

In one or more embodiments, the thermoplastic resins include propylene-based polymers including those solid, generally high-molecular weight plastic resins that primarily comprise units deriving from the polymerization of propylene. In certain embodiments, at least 75%, in other embodiments at least 90%, in other embodiments at least 95%, and in other embodiments at least 97% of the units of the propylene-based polymer derive from the polymerization of propylene. In particular embodiments, these polymers include homopolymers of propylene.

In certain embodiments, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof.

In one or more embodiments, propylene-based polymers may include semi-crystalline polymers. In one or more embodiments, these polymers may be characterized by a crystallinity of at least 25% by weight, in other embodiments at least 55% by weight, in other embodiments at least 65%, and in other embodiments at least 70% by weight. Crystallinity may be determined by dividing the heat of fusion of a sample by the heat of fusion of a 100% crystalline polymer, which is assumed to be 209 joules/gram for polypropylene. In one or more embodiments, these polymers may be characterized by an Hf of at least 52.3 J/g, in other embodiments in excess of 100 J/g, in other embodiments in excess of 125 J/g, and in other embodiments in excess of 140 J/g.

In one or more embodiments, useful propylene-based polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

In one or more embodiments, useful propylene-based polymers can have a MFR (ASTM D-1238, 2.16 kg @ 230° C.) of less than 100 dg/min, in other embodiments less than 50 dg/min, in other embodiments less than 10 dg/min, and in other embodiments less than 5 dg/min. In these or other embodiments, the propylene-based polymers can have a MFR of at least 0.1 dg/min, in other embodiments 0.2 dg/min and in other embodiments at least 0.5 dg/min.

In one or more embodiments, useful propylene-based polymers can have a melt temperature ($T_m$) that is from about 110° C. to about 170° C., in other embodiments from about 140° C. to about 168° C., and in other embodiments from about 160° C. to about 165° C. They may have a glass transition temperature ($T_g$) of from about −10° C. to about 10° C., in other embodiments from about −3° C. to about 5° C., and in other embodiments from about 0° C. to about 2° C. In one or more embodiments, they may have a crystallization temperature ($T_c$) of at least about 75° C., in other embodiments at least about 95° C., in other embodiments at least about 100° C., and in other embodiments at least 105° C., with one embodiment ranging from 105° to 130° C.

The propylene-based polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In particular embodiments, the propylene-based polymers include a homopolymer of a high-crystallinity isotactic or syndiotactic polypropylene. This polypropylene can have a density of from about 0.89 to about 0.91 g/cc, with the largely isotactic polypropylene having a density of from about 0.90 to about 0.91 g/cc. Also, high and ultrahigh molecular weight polypropylene that has a fractional melt flow rate can be employed. In one or more embodiments, polypropylene resins may be characterized by a MFR (ASTM D-1238; 2.16 kg @ 230° C.) that is less than or equal to 10 dg/min, in other embodiments less than or equal to 1.0 dg/min, and in other embodiments less than or equal to 0.5 dg/min.

f. Oils

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. In one or more embodiments, these oligomers include isobutenyl mer units. Exemplary synthetic oils include polyisobutylene, poly(isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil). Oils described in U.S. Pat. No. 5,936,028, which is incorporated herein by reference, may also be employed. It is believed that synthetic oils may provide enhanced low temperature performance. Also, high temperature performance may be enhanced based upon molecular structure.

In one or more embodiments, the extender oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

g. Polymeric Processing Additives

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, in other embodiments, greater than about 750 dg/min, in other embodiments, greater than about 1000 dg/min, in other embodiments, greater than about 1200 dg/min, and in other embodiments, greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference.

h. Zinc Oxide

Useful zinc oxide includes that conventionally employed for rubber processing. In one or more embodiments, the zinc oxide can have a mean particle diameter of about 0.05 to about 0.15 μm. Useful zinc oxide can be obtained commercially under the tradename Kadox™ 911 (Horsehead Corporation).

i. Acid Scavenger

In one or more embodiments, the phenolic resin can be used in conjunction with an acid scavenger, such as a hydrotalcite, which may be added downstream of cure. Useful acid scavengers include hydrotalcite. Both synthetic and natural hydrotalcites can be used. An exemplary natural hydrotalcite can be represented by the formula $Mg_6Al_2(OH)_{16}CO_3 4H_2O$. Synthetic hydrotalcite compounds, which are believed to have the formula $Mg_43Al_2(OH)_{12}6CO_3\ mH_2O$ or $Mg_45Al_3(OH)_{13}CO_3 35H_2O$, can be obtained under the tradenames DHT-4A or Kyowaad 1000 (Kyowa Chemical Industry Co., Japan). Another commercial example is that available under the tradename Alcamizer (Kyowa).

j. Other Constituents

In addition to the rubber, thermoplastic resins, and optional processing additives, the thermoplastic vulcanizates of the invention may optionally include one or more processing oils (aromatic, paraffinic and naphthenic mineral oils), compatibilizers, calcined clay, kaolin clay, nanoclay, talc, silicates, carbonates, sulfates, carbon black, sand, glass beads, mineral aggregates, wollastonite, mica, glass fiber, other filler, pigments, colorants, dyes, carbon black, dispersants, flame retardants, antioxidants, conductive particles, UV-inhibitors, UV-stabilizers, adhesion promoters, fatty acids, esters, paraffin waxes, neutralizers, metal deactivators, tackifiers, calcium stearate, desiccants, stabilizers, light stabilizers, light absorbers, coupling agents including silanes and titanates, plasticizers, lubricants, blocking agents, antiblocking agents, antistatic agents, waxes, foaming agents, nucleating agents, slip agents, acid scavengers, lubricants, adjuvants, surfactants, crystallization aids, polymeric additives, defoamers, preservatives, thickeners, rheology modifiers, humectants, vulcanizing/cross-linking/curative agents, vulcanizing/cross-linking/curative accelerators, cure retarders, reinforcing and non-reinforcing fillers and combinations thereof and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

k. Amounts

In one or more embodiments, the thermoplastic vulcanizates of this invention may contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 wt %, in other embodiments at least about 45 wt %, in other embodiments at least about 65 wt %, and in other embodiments at least about 75 wt % of rubber (i.e., dynamically-vulcanized rubber) based upon the total weight of the thermoplastic vulcanizates. In these or other embodiments, the amount of rubber within the thermoplastic vulcanizates can be from about 15 to about 90 wt %, in other embodiments from about 45 to about 85 wt %, and in other embodiments from about 60 to about 80 wt %, based on the entire weight of the rubber and thermoplastic combined.

In one or more embodiments, the amount of thermoplastic polymer (i.e., uncured polymer within the thermoplastic phase) within the thermoplastic vulcanizates can be from about 10 to about 85 wt %, in other embodiments from about 10 to about 40 wt %, and in other embodiments from about 12 to about 30 wt %, based on the entire weight of the rubber and thermoplastic combined. In these or other embodiments, the amount of thermoplastic polymer within the thermoplastic vulcanizates may be from about 25 to about 250 parts by weight, in other embodiments from about 50 to about 150 parts by weight, and in other embodiments from about 60 to about 100 parts by weight thermoplastic polymer per 100 parts weight rubber.

With respect to the oil, the thermoplastic vulcanizate may include from about 25 to about 250 parts by weight, or from about 50 to about 150 parts by weight, or from about 75 to about 130 parts by weight, of extender oil per 100 parts rubber. The quantity of extender oil added may depend upon the properties desired, with the upper limit depending upon the compatibility of the particular oil and blend ingredients; this limit is exceeded when excessive exuding of extender oil occurs. The amount of extender oil may depend, at least in part, upon the type of rubber. High viscosity rubbers are more highly oil extendable.

Fillers, such as carbon black, clay, talc, or calcium carbonate may be added in amount from about 1 to about 250 parts by weight, in other embodiments from about 10 to about 150 parts by weight, and in other embodiments from about 25 to about 50 parts by weight, per 100 parts by weight of rubber. The amount of carbon black that can be used may depend, at least in part, upon the type of carbon black and the amount of extender oil that is used.

l. Masterbatch

As discussed above, the masterbatch includes a blend of stannous chloride and thermoplastic resin. The thermoplastic resin may be referred to as the second thermoplastic resin inasmuch as the process may include an additional thermoplastic resin feed in addition to the thermoplastic resin delivered with the masterbatch. The second thermoplastic resin may be the same resin employed as the first thermoplastic resin, or in other embodiments the second thermoplastic resin may be distinct from the first thermoplastic resin. In particular embodiments, the stannous chloride is an anhydrous stannous chloride.

In one or more embodiments, the masterbatch of the stannous chloride and the thermoplastic resin may include ≥10 wt %, in other embodiments ≥20 wt %, in other embodiments ≥30 wt %, in other embodiments ≥40 wt %, and in other embodiments ≥50 wt % stannous chloride based on the total weight of the masterbatch. In these or other embodiments, the thermoplastic resin may include ≤90 wt %, in other embodiments ≤80 wt %, in other embodiments ≤70 wt %, in other embodiments ≤60 wt %, and in other embodiments ≤50 wt % stannous chloride based on the total weight of the masterbatch. In these or other embodiments, the masterbatch of the stannous chloride and the thermoplastic resin may include from about 10 to about 90 wt %, in other embodiments from about 20 to about 80 wt %, in other embodiments from about 30 to about 70 wt %, and in other embodiments from about 40 to about 60 wt % stannous chloride based on the total weight of the masterbatch. In one or more embodiments, the balance of the masterbatch includes a thermoplastic resin (i.e., the second thermoplastic resin).

The stannous chloride can be used in its hydrous ($SnCl_2 \cdot H_2O$) or anhydrous ($SnCl_2$) form. The stannous chloride can be used in a powdered, granulated, or flake form.

m. Phenolic Resin Curative

Useful phenolic cure systems are disclosed in U.S. Pat. Nos. 2,972,600, 3,287,440, 5,952,425 and 6,437,030, which are incorporated herein by reference. In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins is employed. The blend includes from about 25 to about 40 wt % octylphenol-formaldehyde and from about 75 to about 60 wt % nonylphenol-formaldehyde, in other embodiments, the blend includes from about 30 to about 35 wt % octylphenol-formaldehyde and from about 70 to about 65 wt % nonylphenol-formaldehyde. In one embodiment, the blend includes about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins. SP-1045 is believed to be a blend of octylphenol and nonylphenol formaldehyde resins that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

An example of a phenolic resin curative includes that defined according to the general formula:

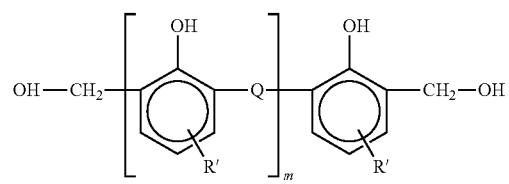

where Q is a divalent radical selected from the group consisting of —$CH_2$—, —$CH_2$—O—$CH_2$—; m is zero or a positive integer from 1 to 20 and R' is an organic group. In one embodiment, Q is the divalent radical —$CH_2$—O—$CH_2$—, m is zero or a positive integer from 1 to 10, and R' is an organic group having less than 20 carbon atoms. In other embodiments, m is zero or a positive integer from 1 to 10 and R' is an organic radical having between 4 and 12 carbon atoms.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 parts by weight of rubber. A complementary amount of stannous chloride may include from about 0.5 to about 2.0 parts by weight, in other embodiments from about 1.0 to about 1.5 parts by weight, and in other embodiments from about 1.2 to about 1.3 parts by weight per 100 parts by weight of rubber. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

In one or more embodiments, the second thermoplastic resin includes polypropylene or propylene-based thermoplastic polymers that have an MFR (ASTM D-1238, 2.16 kg @ 230° C.) of less than 10 dg/min, in other embodiments less than 5 dg/min, in other embodiments less than 1 dg/min, and in other embodiments less than 0.7 dg/min. In these or other embodiments, the propylene-based polymers can have a MFR of at least 0.1 dg/min, in other embodiments 0.2 dg/min and in other embodiments at least 0.5 dg/min.

In one or more embodiments, the masterbatch that includes the stannous chloride in the second thermoplastic resin may be in the form of a particle or particles, which may also be referred to as pellets. In one or more embodiments, the particles or pellets are free-flowing. In particular embodiments, the particles are characterized by an average diameter of from about 0.25 mm to about 10 mm, in other embodiments from about 0.5 mm to about 5 mm, and in other embodiments from about 1 mm to about 4 mm.

In particular embodiments, the stannous chloride in second thermoplastic elastomer are further combined with other ingredients to form a masterbatch, which may be in the form of a particle that may be introduced to the extruder. For example, the masterbatch may further include an inert filler such as a clay, silica, or carbon black. In one or more embodiments, the masterbatch includes less than about 25% by weight in other embodiments less than about 15% by weight, in other embodiments less than about 5% by weight, and in other embodiments less than about 1% by weight of a filler or other inert material (i.e., material other than stannous chloride or the second thermoplastic resin).

IV. Product Characteristics

In one or more embodiments, the thermoplastic vulcanizate composition includes a continuous thermoplastic phase with a cured rubber phase dispersed therein. In particular embodiments, the rubber phase is a discontinuous phase dispersed within the thermoplastic phase.

In one or more embodiments, the rubber is advantageously completely or fully cured. The degree of cure can be measured by determining the amount of rubber that is extractable from the thermoplastic vulcanizate by using cyclohexane or boiling xylene as an extractant. These methods are disclosed in U.S. Pat. No. 4,311,628, which is incorporated herein by reference. Preferably, the rubber has a degree of cure where less than 15 weight percent, more preferably less than 10 weight percent, even more preferably less than 5 weight percent, and still more preferably less than 3 weight percent of the rubber is extractable by cyclohexane at 23° C. as described in U.S. Pat. Nos. 5,100,947 and 5,151,081, which are incorporated herein by reference. Alternatively, the rubber has a degree of cure such that the crosslink density is preferably at least $4 \times 10^{-5}$, more preferably at least $7 \times 10^{-5}$, and still more preferably at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

V. Industrial Applicability

The thermoplastic vulcanizate compositions of the present invention have a variety of uses as is known in the art. Practice of the present invention does not necessarily limit the intended or expected uses of the thermoplastic vulcanizates. As is known in the art, thermoplastic elastomers of this invention are useful for making a variety of articles such as weather seals, hoses, belts, gaskets, moldings, boots, elastic fibers, and like articles. They are useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In one or more embodiments, the processes of the present invention are particularly useful for forming thermoplastic vulcanizates that can advantageously be employed to prepare extruded articles with desirable surface appearance including desirable surface smoothness. In particular embodiments, these thermoplastic vulcanizates are relatively soft (e.g., shore A hardness below 50) and therefore the ability to achieve technologically useful surface appearance is highly advantageous and unexpectedly surprising.

VI. Specific Embodiments

Paragraph A: A method for making a thermoplastic vulcanizate, the method comprising the steps of: charging vulcanizable rubber to a reactor; charging a masterbatch of thermoplastic resin and a catalyst for a phenolic resin curative to the reactor; charging a phenolic resin curative to the reactor; and dynamically vulcanizing the rubber with the phenolic resin curative in the presence of the catalyst.

Paragraph B: The method of Paragraph A, further comprising the step of adding to the reactor a thermoplastic resin substantially devoid of a catalyst for the phenolic resin.

Paragraph C: The method of Paragraphs A-B, further comprising the step of mixing the vulcanizable rubber and the masterbatch above the melt temperature of the thermoplastic resin of Paragraphs A and/or B.

Paragraph D: The method of Paragraphs A-C, where the catalyst is stannous chloride.

Paragraph E: The method of Paragraphs A-D, where the catalyst is anhydrous stannous chloride.

Paragraph F: The method of Paragraphs A-E, where the masterbatch includes ≥10 wt % and ≤70 wt % stannous chloride based on the total weight of the masterbatch.

Paragraph G: The method of Paragraphs A-F, where the masterbatch is charged to the reactor in the form of pellets.

Paragraph H: The method of Paragraphs A-G, where the thermoplastic resin includes polypropylene.

Paragraph I: A method for making a thermoplastic vulcanizate, the method comprising the steps of:
a. mixing a vulcanizable rubber and a first thermoplastic resin above the melt temperature of the thermoplastic resin to form a molten mass;
b. adding a masterbatch including a second thermoplastic resin and catalyst to the molten mass;
c. melting the second thermoplastic resin of the masterbatch to thereby disperse the catalyst within the molten mass;
d. adding a phenolic curative to the molten mass; and
e. dynamically vulcanizing the rubber with the phenolic resin in the presence of the catalyst.

Paragraph J: The method of Paragraph I, where the vulcanizable rubber is a poly(ethylene-propylene-diene)copolymer, the first thermoplastic resin is polypropylene, and the second thermoplastic resin is polypropylene.

Paragraph K: The method of Paragraphs I-J, where the catalyst is anhydrous stannous chloride.

Paragraph L: The method of Paragraphs I-K, where said dynamic vulcanization is effected in the presence of ≥10 wt % and ≤70 wt % stannous chloride based on the total weight of the masterbatch.

Paragraph M: A method for making a thermoplastic vulcanizate, the method comprising the steps of: charging a poly(ethylene-propylene-diene)copolymer to a twin-screw extruder through the feed throat of the extruder; charging polypropylene to the twin-screw extruder through the feed throat of the extruder; mixing, within an initial mix zone, the poly(ethylene-propylene-diene)copolymer and the polypropylene at a temperature above the melt temperature of the polypropylene to form a molten mass; charging pellets that include a blend of polypropylene and anhydrous stannous chloride to the twin-screw extruder through an inlet in a barrel downstream of the initial mix zone; heating the pellets above the melt temperature of the polypropylene and mixing the molten polypropylene with the molten mass; charging a phenolic resin curative to the twin-extruder through an inlet in a barrel downstream of the barrel where the pellets are charged; mixing the phenolic resin with the molten mass while transferring the molten mass through a cure zone where dynamic vulcanization of the rubber takes place to thereby form a thermoplastic vulcanizate; removing the thermoplastic vulcanizate from the twin-screw extruder; cooling the thermoplastic vulcanizate; and pelletizing the thermoplastic vulcanizate.

Paragraph N: A thermoplastic vulcanizate made by the method of Paragraphs A-M.

In order to demonstrate the practice of the present invention, the following examples have been prepared and tested. The examples should not, however, be viewed as limiting the scope of the invention.

EXAMPLES

Samples 1-4

Thermoplastic vulcanizates were prepared within a twin-screw extruder generally having an L/D of about 40. Three comparative samples were prepared by introducing stannous chloride to the extruder by using a powder feeder. Three inventive samples were prepared by introducing stannous chloride to the extruder in the form of a masterbatch pellet by means of a pellet feeder.

In each sample, the solid ingredients were fed to the feed throat of the extruder. These solid ingredients included the rubber, the thermoplastic resin, the filler, the zinc oxide, and the stannous chloride. Additional oil was injected into the extruder downstream of the feed throat prior to the cure zone. A phenolic resin-oil mixture was then injected into the extruder immediately prior to the cure zone, and additional oil was injected into the extruder after the cure zone. The rubber was added at the feed throat in the form of a crumb that was mixed with the filler. The zinc oxide was introduced as a masterbatch with a portion of the filler by using a powder feeder. Where the stannous chloride was added via the powder feeder, it was added in a mixture with the zinc oxide and a portion of the filler. Where the stannous chloride was added as a masterbatch via a pellet feeder, some of the polypropylene pellets that would have otherwise been conventionally added via a separate pellet feeder, were diverted to the pellet feeder that was feeding the stannous chloride in order to facilitate transfer of the masterbatch pellets; this polypropylene has been designated as "feed assist" in Table I.

The amount of the ingredients that were employed are set forth in Table I, along with the results of various physical tests that were performed on the resultant thermoplastic vulcanizate.

The rubber that was employed was an elastomeric copolymer. The elastomeric copolymer was poly(ethylene-co-propylene-co-5-ethylidene-2-norbornene) characterized by having a diene content of about 3.9 weight percent, a Mooney viscosity $ML_{(1+4)}$@125° C. of about 52 (oil extended), an intrinsic viscosity (dl/g) in decalin at 135° C. of about 4 dl/g, a weight average molecular weight of about 850 kg/mole, a number average molecular weight of about 170 kg/mole, an ethylene content of about 64 weight percent, a paraffinic oil content of 75 phr (the parts by weight in Table I referring to the amount of rubber and paraffinic oil) and was obtained under the tradename V3666™ (Exxon Mobil Corp). The phenolic resin was a resole-type resin, including a blend of octylphenol and nonylphenol formaldehyde dispersed in paraffinic oil. The polypropylene was obtained under the tradename PP534-1™ (ExxonMobil) and was characterized by an MFR of 0.8. The extender oil was a paraffinic oil obtained under the tradename Sunpar 150M™ (Sunoco). The filler was a clay filler obtained under the tradename Icecap K™ (Burgess). The black concentrate was a commercial blend including 40% carbon black and polypropylene, which obtained under the tradename 49974™ (Ampacet). The wax was obtained under the tradename 2709™ (Okerin). The stannous chloride/polypropylene masterbatch included 45% by weight stannous chloride based upon the total weight of the masterbatch, with the balance being polypropylene.

TABLE I

| | phr | phr | phr | phr | phr | phr | phr | phr |
|---|---|---|---|---|---|---|---|---|
| Raw material | | | | | | | | |
| Elastomeric copolymer | 175 | 175 | 175 | 175 | 175 | 175 | 175 | 175 |
| Clay | 42 | 42 | 42 | 42 | 42 | 42 | 42 | 42 |
| Stannous Chloride | 1 | 0.075 | 0.5 | | | | | |
| Stannous Chloride-Polypropylene masterbatch | | | | 2.22 | 1.67 | 1.11 | 0.89 | 0.67 |
| Zinc Oxide | 1.4 | 1.4 | 1.4 | 1.4 | 1.4 | 1.4 | 1.4 | 1.4 |
| Polypropylene | 39.26 | 39.26 | 39.26 | 26.94 | 29.99 | 33.1 | 31.7 | 33.5 |
| Polypropylene (Feed Assist) | 0 | 0 | 0 | 11.1 | 8.35 | 5.55 | 7.1 | 5.4 |
| Phenolic resin-oil masterbatch | 10 | 10 | 10 | 10 | 10 | 10 | 10 | 10 |
| Paraffinic oil prior to vulcanization | 10.83 | 10.83 | 10.83 | 10.83 | 10.83 | 10.83 | 10.8 | 10.8 |
| Paraffinic oil after vulcanization | 43.31 | 43.31 | 43.31 | 43.31 | 43.31 | 43.31 | 43.3 | 43.3 |
| Total | 347.05 | 346.8 | 346.55 | 347.05 | 346.8 | 346.55 | 346.45 | 346.35 |
| Mechanical Testing | | | | | | | | |
| Shore A Hardness | 73.4 | 70.8 | 73.1 | 72.5 | 71.6 | 72.4 | 72.2 | 70.9 |
| Specific Gravity | 0.967 | 0.965 | 0.967 | 0.967 | 0.965 | 0.969 | 0.970 | 0.976 |
| Mechanical Testing | | | | | | | | |
| Ultimate Tensile Strength (psi) | 990 | 1120 | 1060 | 1040 | 1060 | 1020 | 1010 | 850 |
| M100 (psi) | 410 | 400 | 420 | 420 | 400 | 410 | 400 | 360 |
| Tear Strength (lbs/in) | 182.2 | 169.6 | 161.3 | 176.2 | 173.6 | 172.6 | 174.8 | 175.1 |
| ESR (Ra min) | 43 | 32 | 47 | 54 | 46 | 44 | 40 | 40 |
| Compression Set, 22 hr @ 70° C., (%) | 27.3 | 27.2 | 26.1 | 25.9 | 26.2 | 26.7 | 27.3 | 37.5 |
| Compression Set, 168 hr @ 125° C., (%) | 51.7 | 50.7 | 49.7 | 48.3 | 51.1 | 51.4 | 51.5 | 68.5 |

Specific gravity was determined according to ASTM D-792. Shore hardness was determined according to ISO 868 with a five-second time interval. Data for 10% modulus, ultimate tensile strength, elongation at break (ultimate elongation), and maximum strain were determined according to ISO 37 at 23° C. (unless otherwise specified) at 50 mm per minute by using an Instron testing machine. Compression set was according to ASTM D-395 Method B for either 22 hours at 70° C. or for 168 hours at 125° C. ESR, which stands for extrusion surface roughness, was determined. Extrusion surface roughness (ESR) in microinches (micrometers) was measured as described in Chemical Surface Treatments of Natural Rubber and EPDM Thermoplastic Elastomers: Effects on Friction and Adhesion, RUBBER CHEMISTRY AND TECHNOLOGY, Vol. 67, No. 4, p. 586 (1994). The rating for each sample was determined by using a stylus profilometer.

The data in Table I show that comparable results are obtained when stannous chloride is introduced to the extruder via a powder feeder or by way of a masterbatch with polypropylene using a pellet feeder. These results are significant because as those skilled in the art appreciate, powder feeding stannous chloride is a very precise and accurate means for delivering stannous chloride to an extruder, but powder feeding suffers from many drawbacks that are not experienced by pellet feeding. For example, feeding stannous chloride to an extruder by way of a powder feeder can be difficult because powders are difficult to handle, powder feeders are expensive, and powder feeders can be difficult to incorporate into large manufacturing processes. Thus, by discovering a means to deliver stannous chloride to an extruder by using a pellet feeder in the form of a pellet, while obtaining comparable results to those obtained when a powder feeder is employed, the present invention offers a significant technological advantage.

Headings used herein are for reference only and are not intended to limit any aspect of the invention. Various modifications and alterations that do not depart from the scope and spirit of this invention will become apparent to those skilled in the art. This invention is not to be duly limited to the illustrative embodiments set forth herein.

What is claimed is:

1. A method for making a thermoplastic vulcanizate, the method comprising the steps of:
    charging vulcanizable rubber and a first thermoplastic resin to a reactor to form a molten mass, wherein the first thermoplastic resin is substantially devoid of a catalyst for the phenolic resin;
    charging a masterbatch consisting essentially of a second thermoplastic resin and a catalyst for a phenolic resin curative to the molten mass in the reactor, wherein the masterbatch contains ≥10 wt% and ≤90 wt% of the catalyst based on the total weight of the masterbatch and wherein the masterbatch contains less than 1 wt% of material other than the catalyst or the second thermoplastic resin based on the weight of the masterbatch;
    charging a phenolic resin curative to the molten mass reactor; and
    dynamically vulcanizing the rubber with the phenolic resin curative in the presence of the catalyst.

2. The method of claim 1, further comprising the step of mixing the vulcanizable rubber and the masterbatch above the melt temperature of the first thermoplastic resin.

3. The method of claim 1, where the catalyst is stannous chloride.

4. The method of claim 1, where the catalyst is anhydrous stannous chloride.

5. The method of claim 1, where the masterbatch includes ≥20 wt% and 70 wt% stannous chloride based on the total weight of the masterbatch.

6. The method of claim 1, where the masterbatch is charged to the reactor in the form of pellets.

7. The method of claim 1, where the first thermoplastic resin includes polypropylene.

8. A method for making a thermoplastic vulcanizate, the method comprising the steps of:
    a. mixing a vulcanizable rubber and a first thermoplastic resin above the melt temperature of the thermoplastic resin to form a molten mass;
    b. adding a masterbatch consisting of a second thermoplastic resin and catalyst to the molten mass;
    c. melting the second thermoplastic resin of the masterbatch to thereby disperse the catalyst within the molten mass;
    d. adding a phenolic curative to the molten mass; and
    e. dynamically vulcanizing the rubber with the phenolic resin in the presence of the catalyst.

9. The method of claim 8, where the vulcanizable rubber is a poly(ethylene-propylene-diene)copolymer, the first thermoplastic resin is polypropylene, and the second thermoplastic resin is polypropylene.

10. The method of claim 8, where the catalyst is anhydrous stannous chloride.

11. The method of claim 8, where said dynamic vulcanization is effected in the presence of ≥10 wt% and ≤70 wt% stannous chloride based on the total weight of the masterbatch.

12. A method for making a thermoplastic vulcanizate, the method comprising the steps of: charging a poly(ethylene-propylene-diene)copolymer to a twin-screw extruder through the feed throat of the extruder; charging polypropylene to the twin-screw extruder through the feed throat of the extruder; mixing, within an initial mix zone, the poly(ethylene-propylene-diene)copolymer and the polypropylene at a temperature above the melt temperature of the polypropylene to form a molten mass; charging pellets that include a blend of polypropylene and anhydrous stannous chloride to the twin-screw extruder through an inlet in a barrel downstream of the initial mix zone, wherein the pellets include less than 1% of material other than the stannous chloride or the polypropylene based on the weight of the pellet; heating the pellets above the melt temperature of the polypropylene and mixing the molten polypropylene with the molten mass; charging a phenolic resin curative to the twin-extruder through an inlet in a barrel downstream of the barrel where the pellets are charged; mixing the phenolic resin with the molten mass while transferring the molten mass through a cure zone where dynamic vulcanization of the rubber takes place to thereby form a thermoplastic vulcanizate; removing the thermoplastic vulcanizate from the twin-screw extruder; cooling the thermoplastic vulcanizate; and pelletizing the thermoplastic vulcanizate.

13. A thermoplastic vulcanizate made by the method of claim 1.

14. A thermoplastic vulcanizate made by the method of claim 8.

15. A thermoplastic vulcanizate made by the method of claim 13.

* * * * *